May 20, 1930. H. W. PLEISTER ET AL 1,759,416
METHOD OF MANUFACTURING FORGED PERCUSSION MASONRY TWIST DRILLS
Filed March 24, 1928 2 Sheets-Sheet 1

May 20, 1930.   H. W. PLEISTER ET AL   1,759,416
METHOD OF MANUFACTURING FORGED PERCUSSION MASONRY TWIST DRILLS
Filed March 24, 1928    2 Sheets-Sheet 2
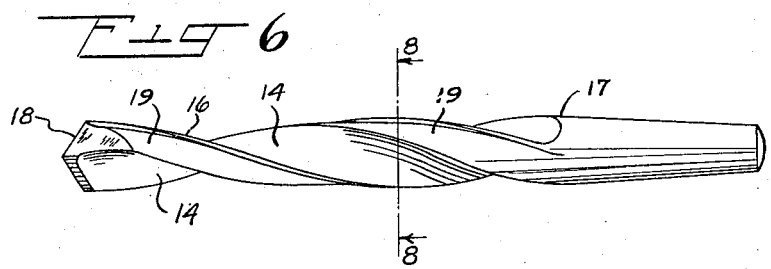
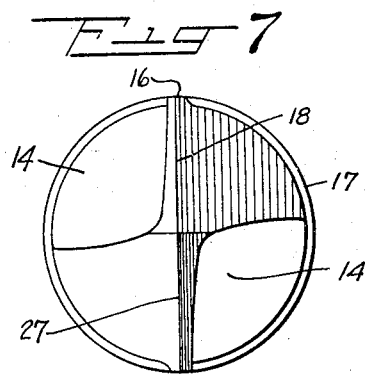
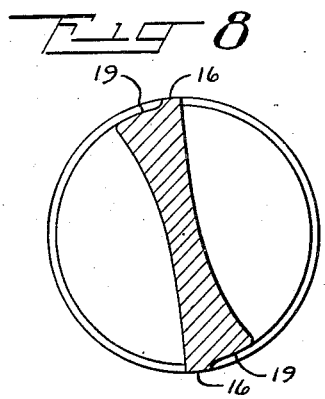
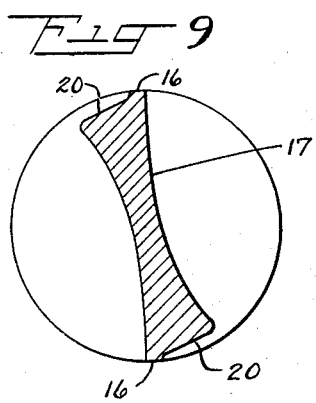
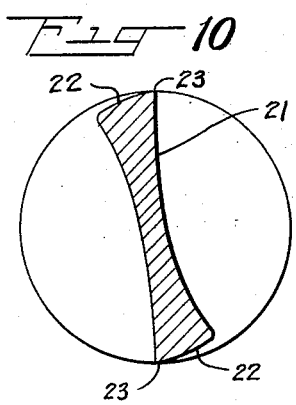
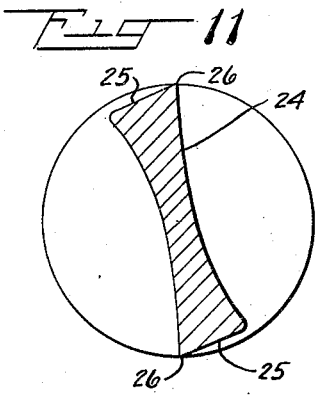
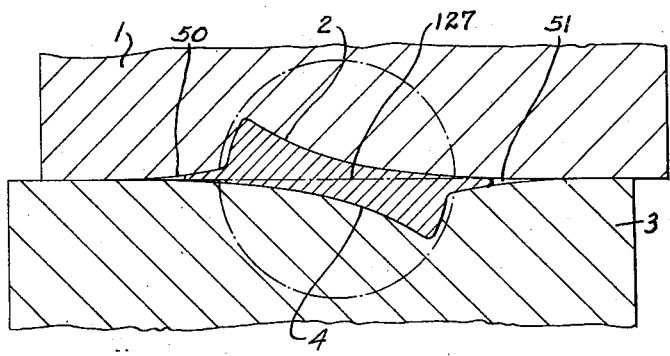
INVENTORS
Henry W. Pleister
John Kautzky
BY
Alexander Johnson
ATTORNEY.

Patented May 20, 1930

1,759,416

UNITED STATES PATENT OFFICE

HENRY W. PLEISTER, OF WESTFIELD, AND JOHN KARITZKY, OF GARWOOD, NEW JERSEY, ASSIGNORS TO HENRY B. NEWHALL CORPORATION, OF GARWOOD, NEW JERSEY, A CORPORATION OF NEW JERSEY

METHOD OF MANUFACTURING FORGED PERCUSSION MASONRY TWIST DRILLS

Application filed March 24, 1928. Serial No. 264,418.

Our invention relates to the method of manufacturing a forged percussion masonry twist drill.

It further relates to the method of manufacturing such a forged twist drill which can be economically made from alloys of steel, such as vanadium, chromium or nickel, all of which steel alloys are too difficult and hard to economically machine, as is the common method of machining a bar of carbon steel to provide it with the desired convolutions to form the ordinary steel twist drill.

Our invention further relates to the method of manufacturing a forged percussion masonry twist drill, the body of which will be of a grain structure to insure uniform toughness, strength and hardness, while the lands will be of especially fine grain structure and therefore tougher, have greater strength and hardness than the body due to the fact that the steel in the flashing will be of finer texture and thus form a still better quality of steel. Such a forged twist drill will withstand the much more severe duty imposed upon a percussion twist drill, as compared to that required of a steel rotary twist drill. Among other advantages, we obviate, for example, weak spots in an ordinary twist drill, due to machining out the convolutions from a bar of steel and thereby changing the equilibrium of the strains and stresses in the bar which may be perfectly harmless in a rotary steel drill. Such a machine twist drill cannot be successfully used as a percussion twist drill in view of the much harder uses to which the drill is put, and the work it has to perform to withstand the multiple blows of a hammer, or hammer mechanism, which in practice soon cause a machine twist drill to fail.

Our invention further relates to certain methods of manufacture and sub-methods of manufacture, all of which will be more fully hereinafter described and pointed out in the claims. In the drawings we have shown different embodiments of our invention, but it is, of course, to be understood that our invention is not to be confined to these particular embodiments shown by way of illustration.

Fig. 6 is a perspective view of one form of our complete forged percussion masonry twist drill;

Fig. 7 is an end view of the drill of Fig. 6 showing the chisel cutting edge;

Fig. 8 is a vertical section on the line 8—8 of Fig. 6;

Fig. 9 is a vertical section showing a modified form of construction;

Fig. 10 is a vertical section showing another modified form of construction;

Fig. 11 is a cross section showing another modification; and

Fig. 12 is a vertical section showing a different, or modified form of adjusting the upper and lower die blocks.

Figure 1:
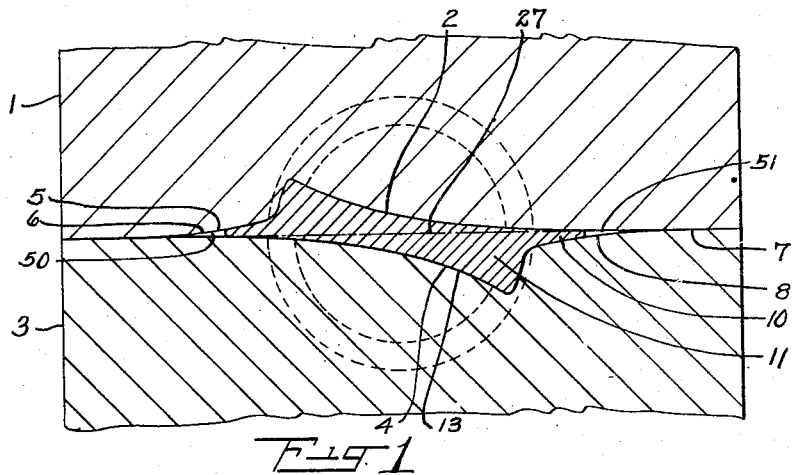
Fig. 1 is a fragmentary vertical section through an upper and lower die block showing one method of manufacturing the drill blank by forging.

It is found in practice that ordinary rotary twist drills for cutting steel, in which the spiral grooves are formed by machining a drill rod, will not stand the wear of rough usage of a masonry percussion drill where the drill is subjected to multiple blows of a hammer, or hammer mechanism actuated by any suitable power. This is partly due to the milling operation, forming the spiral grooves in the rod, changing the internal strains and stresses of the steel, thereby forming weak spots and weak sections in various parts of such a steel twist drill. Such a drill may be perfectly satisfactory for rotary steel work, but is totally unsatisfactory for working in masonry under the actuation of repeated blows of a hammer or hammer mechanism.

By our invention we cheaply and economically make a forged percussion masonry twist drill in which there are no weak spots, or weak sections, due to changing the internal strains and stresses of the steel in the drill; but on the contrary our drill is of uniform toughness and strength throughout, and devoid of the strains and counter-strains which are in rotary machine twist drills, and which lead to their failure in the different art to which our invention applies. While we refer to uniformity of quality of steel throughout, it should, of course, be understood, that, as previously pointed out, the texture of the steel at the lands is improved by its extrusion into the flashing. It is also more economical and improves the grain structure to form the concave fluted section of our drill by forging than by the machine process.

In the art of masonry drills a twist drill of a hard alloy of steel such as vanadium, chromium or nickel, or similar hard alloy, would be desirable to obtain the requisite strength and rigidity, but it is not feasible to economically form such a twist drill because it is too expensive to machine out the spiral grooves from such a drill rod, this being the ordinary practice, with carbon steel.

We form our upper die block 1 with a convex portion 2; the lower die block 3 having a corresponding convex portion 4. In the preferred method the meeting surface of the upper die block 1 is eased off or cut away at 5 to form a tapering portion 6, this portion, with the flat surface of the lower die block forming a recess 50. The lower die block 3 has its meeting surface 7 eased off or tapered at 8 to form a tapered recess 51 with the flat surface of the upper die block 1 into which the flashing 10 of the drill blank 11 is forced as the upper die block 1 and lower die block 3 are brought together by suitable mechanism in the forging operation. These recesses 50—51 are preferably formed a little larger than necessary to accommodate various lengths of flashing 10—10, for the flashing varies somewhat with different drill blanks. It will be noted that the upper die block 1 is cut away or eased off on one side and the lower die block is eased off or cut away on the other side, there being a flat face of the opposing die block cooperating with each cut away portion, Fig. 1.

The convex portion 2 of the upper die forms a complementary concave surface 12 in the drill blank 11. The convex surface 4 in the lower die block 3 forms the corresponding concave portion 13 on the lower portion of the drill blank 11 (see Fig. 1). These concave portions 12 and 13 in the blank form the resulting concave fluted sections which, after the drill blade 15 is twisted, form the flutes 14—14 in the complete forged twist drill shown in Fig. 6.

Figure 2:
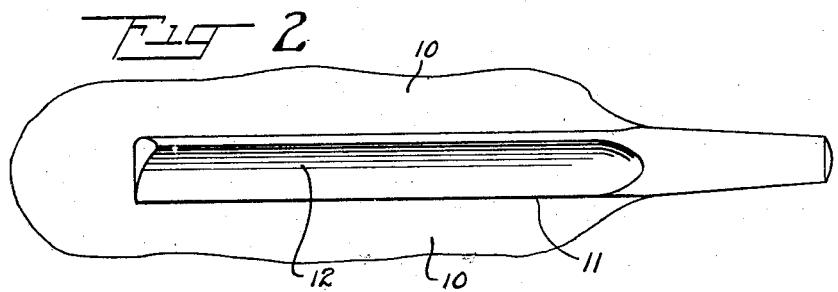
Fig. 2 is a plan view showing the drill blank removed from the upper and lower die block.
Figure 3:
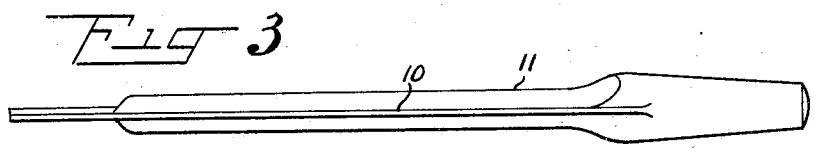
Fig. 3 is a plan view of the drill blank of Fig. 2 rotated 90° from the position of Fig. 2 and looking down on the flashing.

When the drill blank 11 is removed from the die, its shape is substantially that shown in Figs. 2 and 3. The flashing 10—10 is then cut from the drill blank in the ordinary method, forming a drill blade 15 (Figs. 4 and 5).

Figure 4:
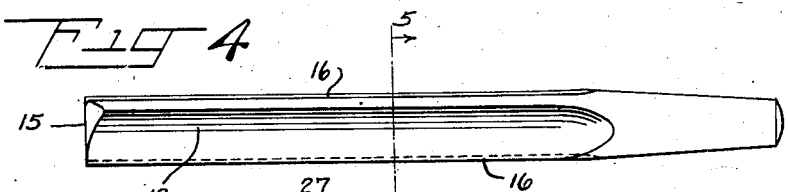
Fig. 4 is a plan view of the drill blade with the flashing removed.
Figure 5:
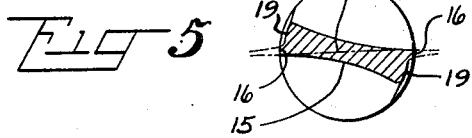
Fig. 5 is a vertical section on the line 5—5 of Fig. 4 looking in the direction of the arrows, some of the flashing being dotted in in this figure simply for purposes of clearer description.

It will be noted, however, that preferably, though not necessarily, all the flashing is not removed, as shown, for example, in Fig. 4 and particularly in Fig. 5, the dotted portion in Fig. 5 being that portion of the flashing which is removed. This leaves a portion of the flashing 16—16 which becomes lands and permanent parts of the drill blade 15 and of the completed twist drill 17 shown in Fig. 6.

In this art of masonry drills it is necessary that the drill be turned in the stone, masonry, concrete or other material slowly, or intermittently, and preferably between each blow of the hammer or the hammer mechanism, though, of course, in some hammer mechanisms it is not feasible to turn the drill partially between the rapid blows of the hammer mechanism, though it is necessary that the drill be turned to change the position of the cutting edge 18 of the drill between each blow so that new surfaces of the material being drilled will be attacked at each successive blow, and to prevent jamming of the drill within the hole.

It is therefore desirable to have a radial clearance to permit easy turning of the twist drill within the hole, so that the chisel cutting edge 18 (Fig. 6) will be presented to different surfaces in the hole.

In Figs. 5 and 8 the radial clearances 19—19 are just back of the lands 16—16. In the preferred construction the radial clearances 19—19 are arcuate as more clearly shown in Fig. 8. In the modification shown in Fig. 9 the radial clearance 20 just back of the land 16 is straight. In Fig. 10 we have shown a modification in which our forged percussion masonry twist drill 21 is not provided with a land but is provided with radial clearances formed by the arcuate surfaces 22—22 just back of the cutting edge 23—23 of the drill.

We have shown still another modification in Fig. 11 in which our forged percussion masonry twist drill 24 is provided with a radial clearance by the straight surfaces 25—25 back of the cutting edges 26—26, there being no land employed in this form.

By sinking the twist drill impression diagonally in the upper die block 1 and the lower die block 3 causes the parting line of the dies to coincide with the diagonal line 27 which connects the two flashings 10, 10. This permits the upper and lower die blocks 1 and 3 respectively to be readily withdrawn from the drill blank 11.

It is along this parting line 27, which extends diagonally from one land 16 to the opposite land 16, that the chisel cutting edge 18 is formed by the die blocks 1 and 3. This diagonal line 27 is the line of greatest diameter and extends diagonally across the end of the drill so that each land 16, 16 forms a part of the chisel cutting edge. The chisel cutting edge 18 being shaped in the die blocks, and being coincident with the parting line of the die blocks, therefore requires but little grinding to sharpen it, thereby very materially cheapening the cost of manufacture.

After the surplus flashing is removed, a drill blade is formed as shown in Fig. 4. It is then twisted in any suitable manner to form the flutes 14—14 as shown in Figs. 6 and 7. The chisel cutting edge 18 is then ground but the amount of grinding is very materially reduced as previously pointed out.

By our improved method we insure that a given set of upper and lower die blocks 1 and 3 can be employed to make more than one diameter of twist drills. Furthermore, we compensate for wear, or what is technically known as "washing", in the impression in the dies 1 and 3. In ordinary forging, when through wear or "washing" the impression in the die blocks becomes enlarged to such an extent as to make an imperfect or useless article, the entire face of the die blocks have to be machined off and a new impression sunk, or the die blocks have to be thrown away, either or both of which add greatly to the expense of manufacture.

We obviate this heavy expense, and also permit different size twist drills to be manufactured, with the same set of dies, by setting the upper die block 1 and the lower die block 3 in different relation to each other, as for example, that shown in Fig. 12 where the upper die block 1 has been moved to the right somewhat from the position shown in Fig. 1. This will decrease the diameter of the drill blade, and of the twist drill formed from it, because the diameter of the drill represented by line 127 will be somewhat shorter than the corresponding line 27 in Fig. 5 (on a smaller scale). When the drill blade shown in Fig. 12, is twisted, a forged twist percussion drill will be formed somewhat shorter in diameter than the forged twist drill 17 (Fig. 6); for the drill blade 15 (Fig. 4) was formed when the upper and lower dies 1 and 3 registered as shown in Fig. 1.

By reversing the relation of the upper and lower die blocks shown in Fig. 12, so that the upper die block is moved a corresponding distance to the left, instead of to the right, as shown in said figure, a larger drill blade, and a forged twist drill somewhat larger in diameter will be formed, than when the upper and lower dies 1 and 3 register as illustrated in Fig. 1.

In some cases we may cut off all the flashing and not use any lands. Such constructions are shown in Fig. 10 and Fig. 11.

Having thus described this invention in connection with illustrative embodiments thereof, to the details of which we do not desire to be limited, what is claimed as new and what is desired to secure by Letters Patent is set forth in the appended claims.

What we claim is:—

1. The method of manufacturing a complete integral forged twist masonry boring percussion drill having a chisel cutting or boring end consisting in forging the drill blank and using the flashing to form lands and the chisel cutting or boring edge, so that the chisel cutting or boring end will be of maximum strength, rigidity and toughness and will only require the minimum amount of grinding, trimming off some of the flashing, and twisting the blank.

2. The method of manufacturing a complete integral forged twist masonry boring percussion drill having a chisel cutting or boring end consisting in forging the drill blank and using the flashing to form lands and the chisel cutting or boring edge, said chisel or boring edge including the exterior extremities of the opposed lands, trimming the blank, and twisting it to form the completed twist drill.

HENRY W. PLEISTER.
JOHN KARITZKY.